Patented June 6, 1933

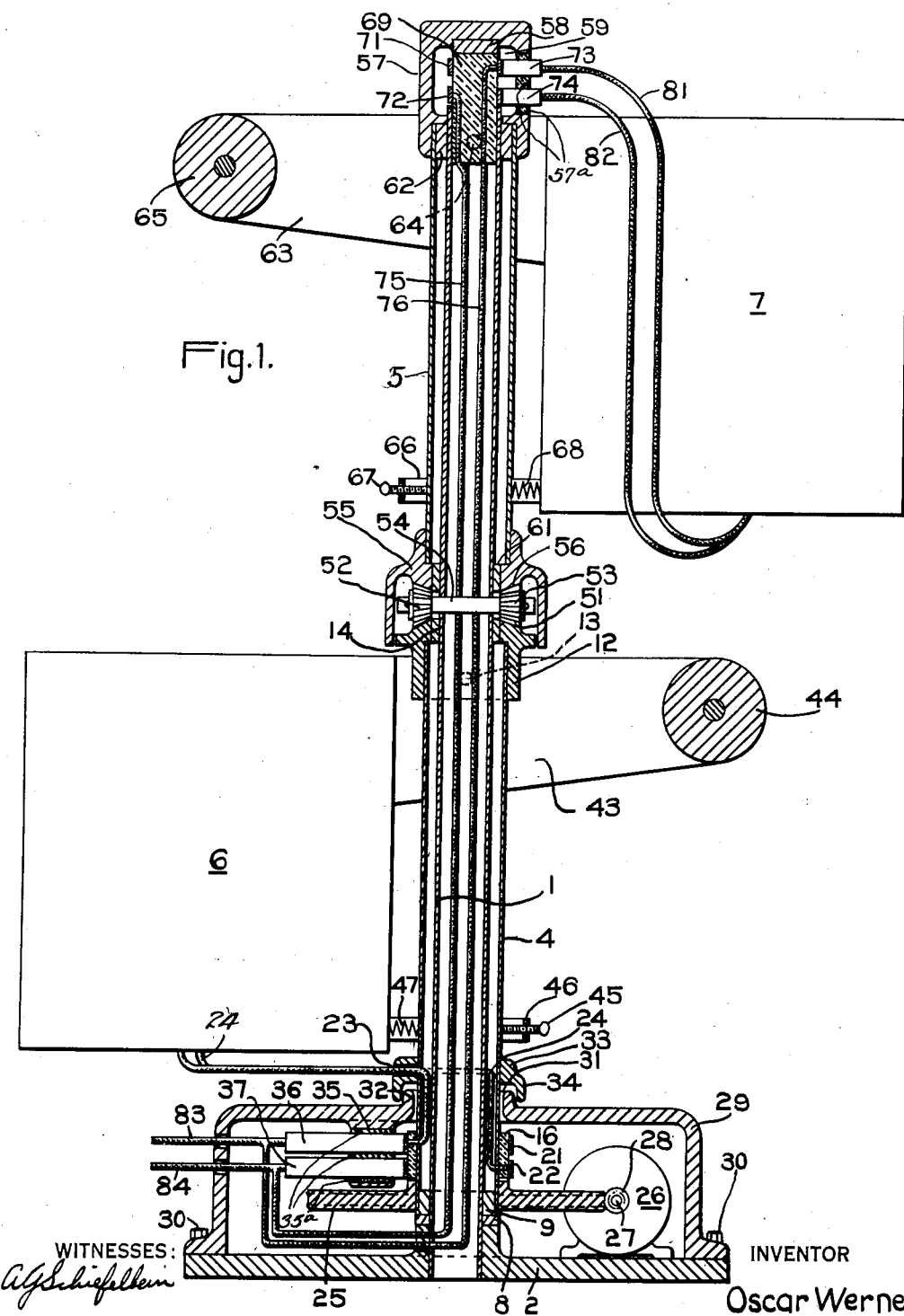

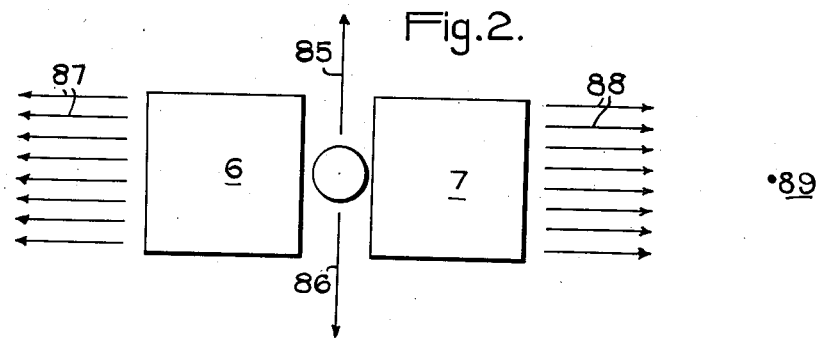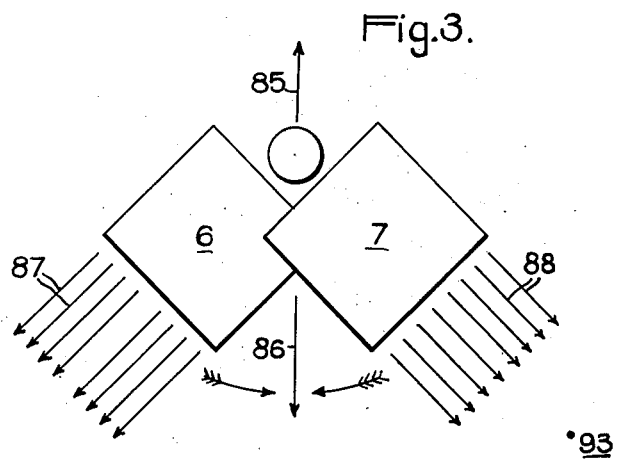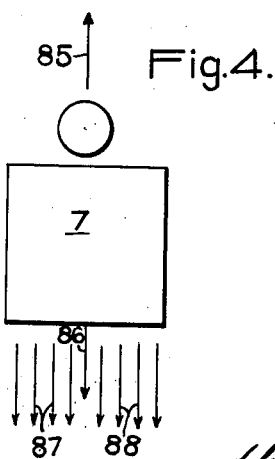

1,912,928

UNITED STATES PATENT OFFICE

OSCAR WERNER, OF SOUTH BEND, INDIANA, ASSIGNOR TO WESTINGHOUSE ELECTRIC & MANUFACTURING COMPANY, A CORPORATION OF PENNSYLVANIA

DIRECTION INDICATING BEACON

Application filed February 21, 1927. Serial No. 169,806.

My invention relates to lighting fixtures and has particular reference to a lighting device for indicating the proper direction of flight to aviators and the like.

A part of the indicating equipment for use in aviation is the rotating beacon, the powerful beam of which sweeps the horizon and apprises the aviator of the location of the proper course of travel or the "airway."

Simple rotating beacons serve their purpose well, namely, that of locating the "airway" when a number of them are visible to the aviator, but such a device is disadvantageous in that it fails to indicate to the aviator the direction of the aerial pathway when only one beacon is in sight.

Therefore, one of the objects of my invention is to provide a rotating beacon which will inform the aviator whether or not he is on the proper course, even though only one light is visible.

Another object of my invention is to provide a device of the class described which will inform the aviator of the extent that he has deviated from the predetermined course.

Another object of my invention is to provide a beacon having a factor of safety, in that a single light source is not depended upon, so that if one light source fails, another will continue to operate.

A still further object of my invention is to provide a device of the above character which shall be simple and rugged in construction and economical to manufacture and maintain.

My device comprises two projectors mechanically rotated about a vertical axis in opposite directions. The projectors are disposed so that the beams will be in the same vertical plane twice in each revolution and the rotation of the projectors is so regulated that the points of intersection of the beams will occur at selected points in the "airway."

My invention may best be understood by reference to the drawings, in which,

Fig. 1 is a view of my device, partially in section and partially in elevation;

Fig. 2 is a diagrammatic view of my device showing the arrangement of the beacons at that period of rotation when the projected beams are positioned at 180° from each other;

Fig. 3 is a diagrammatic representation of the projectors as the beams approach each other, and Fig. 4 is a similar representation of the projectors at the moment that the beams are in the same vertical plane.

Referring to Fig. 1, my device comprises a hollow post or shaft 1 rigidly mounted on a base plate 2 which, in turn, may be anchored to a suitable foundation. The shaft provides a spindle for supporting a lower sleeve 4 and an upper sleeve 5, which carry the projectors 6 and 7, respectively. The lower sleeve 4 is adapted to rotate freely about the shaft 1 and rests upon a thrust bearing 8 which is provided at the base of the lower sleeve.

A casting 12 is rigidly attached to the top of lower sleeve 4. Bearing bushings 9 and 14 are mounted on the ends of sleeve 4 on the thrust bearing 8, and in casting 12, respectively, to provide for the lateral pressure of sleeve 4 against shaft 1.

An insulating ring 16, which is mounted on the sleeve 4 near the base thereof, constitutes a mounting for the slip rings 21 and 22. Conductors 23 and 24, leading to the projector 6, are suitably fastened to the slip rings.

A worm gear 25, rigidly mounted on the lower end of sleeve 4 just below the insulating ring 16, is operatively connected to a motor 26 which is fastened on the base 2, through the motor shaft 27, which has a worm 28 mounted thereon for engaging the worm gear 25. The speed of the motor, the number and pitch of the teeth in the worm gear and pitch of the worm are usually such as to rotate projectors 6 and 7 at about six revolutions per minute. If the motor speed is too great or the worm gear too large, intermediate gearing may be provided between the motor shaft and the worm.

The motor and electrical connections at the base of the beacon are covered with a housing or casing 29 which is fastened to the base 2 by means of bolts 30. The housing 29 is provided with an opening 31 in its central portion to accommodate the sleeve 4. The edge of the housing is flared upwardly, forming a flange 32, and a collar 33 is fastened to the sleeve 4. The collar 33 is provided with a downwardly extending flange 34 adapted to fit over the flange 32 of the housing and form a closure for shedding water.

A projection 35 on the inner surface of the housing 29 is provided with suitable insulating members 35a for mounting brushes 36 and 37. The current for lighting the lamp in the projector 6 is transmitted to one terminal of the lamp from the main-line conductor 83 through brush 36, slip ring 21 and conductor 23. The opposite lamp terminal is connected to the main-line conductor 84 through conductor 24, slip ring 22 and brush 37.

A bracket 43, attached to the casting 12 by means of pins 13, provides means on one end for mounting the projector 6 and a counterweight 44 on the other end. The bracket may be moved a few degrees upon the pins 13 as an axis in order to raise or lower the projected beam for vertical adjustment. The vertical adjustment of the projector 6 may be made by tilting it several degrees by turning a thumb screw 45 in a stirrup 46. A spring 47 is mounted in the stirrup between the projector 6 and the sleeve 4 so that it forces the thumb screw against the sleeve 4.

The upper surface of the casting 12 is provided with gear teeth 51. Two pinions 52 and 53 are mounted on the shaft 54 which, in turn, is securely fastened in the post 1. Casting 55 is rigidly mounted on the lower end of sleeve 5 and is provided with gear teeth 56, which mesh with the pinions 52 and 53.

A cap 57 is rigidly mounted on the upper end of sleeve 5 to provide an enclosure 59 and a thrust washer 58 is inserted between cap 57 and insulating member 69. The lateral thrust is carried by bearing 61 which is mounted in housing 55 and by the bearing 62 which is mounted in the upper portion of sleeve 5. A bracket 63 carries projector 7 and is attached to cap 57 by means of pins 64 in the same manner as projector 6 is mounted on the bracket 43. A weight 65 is provided in bracket 63 for counterbalancing the projector 7. A stirrup 66, thumb screw 67 and spring 68 are provided for vertically adjusting the projector 7, in the same manner as the stirrup 46, spring 47 and thumb screw 45 are provided for adjusting the vertical position of projector 6.

An insulating member 69 is mounted on the upper end of shaft 1 and slip rings 71 and 72 are mounted thereon. Brushes 73 and 74 are mounted between insulating members 57a on the cap 57 and they connect with main line conductors 83 and 84 through leads 75 and 76 which are brought up through the inside of post 1 and connected to rings 71 and 72. Leads 81 and 82 are electrically connected to the brushes 73 and 74 and to the terminals of the lamp in the projector 7.

In operation, the motor 26 drives the worm gear 25 through the worm 28 which is mounted on the shaft 27 of the motor. The worm gear 25 is keyed on sleeve 4 and it thus turns the sleeve and the projector 6. As the casting 12 is fastened to the sleeve 4, it turns the pinions 52 and 53 which, in turn, drive housing 55, sleeve 5, and projector 7 in a direction opposite to that of the projector 6.

In Figs. 2, 3 and 4 the double arrows 85 and 86 represent the direction of the "airway". The smaller arrows 87 and 88 denote the direction of the beam emanating from the projectors. For purpose of illustration, assume that the aviator is at a point 89 to one side of the "airway" and that the projectors 6 and 7 are rotating six times a minute or once every ten seconds. It is apparent that the aviator will receive two equally spaced flashes from the beacon, one every five seconds, or one for each revolution of each of the beacons. Since he receives a flash every five seconds, and, since the period of rotation of a single beam is once in every ten seconds, he knows that he is receiving alternate flashes from two projectors. Since the flashes are equally spaced, he knows that a line from his position to the beacon is at right angles to the direction of the "airway".

Fig. 3 shows another position of the projectors. Assuming now, that an aviator is at a point 93 at one side of the proper line of travel, he will receive a flash from projector 7 when it is in the position shown in Fig. 3. Shortly thereafter, he will receive a flash from projector 6. The interval between the two flashes will be about two and one half seconds. The beacon 7 will revolve 270° before another flash is visible. The latter flash will be seven and a half seconds after the first one; and then after another two and one half seconds a flash from projector 6 will again be seen.

The shortening of the interval between the flashes is dependent upon the angle between the predetermined direction of travel and the position of the aviator to one side, and in front, of the beacon. As the aviator proceeds toward the beacon and lessens the angle between his direction of flight and the predetermined and correct direction of flight, the short interval between flashes will become less. When the line of flight of the aviator crosses or coincides with the "airway", the two beams will coincide and the aviator will receive one flash every ten seconds.

It is apparent that my invention provides means for informing the aviator as to the position and direction of the "airway", as well as means for informing him as to what correction he should make in his line of flight in order to make it coincide with the direction of the airway. Since my invention utilizes two projectors, it provides additional safety. In case one lamp and projector is injured and extinguished, the other lamp will continue to serve the purpose of an ordinary beacon.

Although I have described one embodiment of my invention, I do not wish to be limited thereto. It is apparent that various modifications of the device may be made without departing from the spirit and scope of my invention as defined in the appended claims.

I claim as my invention:

1. A beacon comprising a base member, a stationary shaft, a lower sleeve rotatably mounted on the lower portion of said shaft, a projector mounted on said lower sleeve, an upper sleeve rotatably mounted on the upper portion of said shaft, a second projector mounted on said upper sleeve, an insulated member mounted on the top of said shaft, rings mounted on said insulating member, a cap mounted on said upper sleeve, a pair of brushes mounted in said cap and adapted to make a sliding electrical connection with said rings and conductors to connect said brushes to said second projector.

2. A beacon comprising a base member, a stationary shaft, a lower sleeve rotatably mounted on the lower portion of said shaft, a projector mounted on said lower sleeve, an upper sleeve rotatably mounted on the upper portion of said shaft, a second projector mounted on said upper sleeve, a motor, geared driving means driven by said motor for rotating said lower sleeve and projector and geared driving means connecting said lower sleeve and said upper sleeve whereby said upper sleeve and projector are driven in a direction opposite to that of the lower sleeve and projector.

3. A system for signalling the direction of a pathway, said system comprising two projected beam-emitting devices rotated in opposite directions about the same vertical axis, the beams being adapted to coincide in the same vertical plane on the pathway, and driving means and coupling means for causing the projectors to be rotated at the same rate of rotation in complete, successive circles in opposite directions.

4. A system for signalling the direction of a pathway, said system comprising two beam-emitting projectors, means for rotating the projectors in opposite directions about the same vertical axis, said projectors being so arranged that the beams emitted thereby coincide in the same vertical plane on the pathway at least once in each revolution, and means disposed between the projectors for causing the projectors to be rotated at the same rate of rotation through at least 360° in opposite directions.

5. A direction-indicating beacon comprising two rotatably mounted substantially horizontal beam projectors, substantially vertically disposed supporting means for said projectors about which said projectors rotate in such manner as to project substantially horizontal beams in a circle having said vertical supporting means as a center, and means coupling the projectors together to effect rotation of the projectors in opposite directions about said vertical supporting means, through complete, continuous, successive circles.

6. A direction-indicating beacon comprising two rotatably mounted horizontal beam projectors, common vertical supporting means for said projectors about which both projectors rotate, the projectors being so arranged as to project a substantially horizontal beam in a complete circle with said supporting means as a center, and coupling means for rotating the projectors synchronously in opposite directions through complete successive continuous circles, whereby said projected beams coincide in the same vertical plane at predetermined points.

7. The method of signalling the direction of an airway comprising projecting two wave beams, and causing the projected beams to continuously and synchronously revolve in substantially horizontal planes in opposite directions so that said beams coincide in the same vertical plane at the airway.

In testimony whereof, I have hereunto subscribed my name this 15th day of February 1927.

OSCAR WERNER.